Aug. 4, 1953

M. A. GOODBAR ET AL 2,647,458

TICKET PRINTING MECHANISM

Filed Aug. 31, 1949

INVENTORS
MAYO A. GOODBAR
RUSSELL G. PRATT

BY  *Earl Benst*

THEIR ATTORNEY

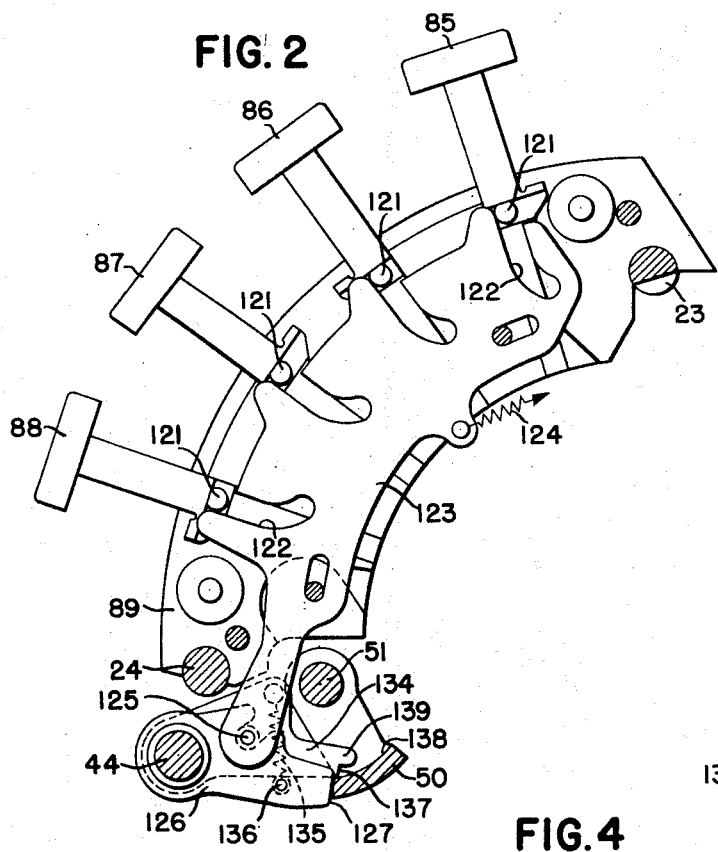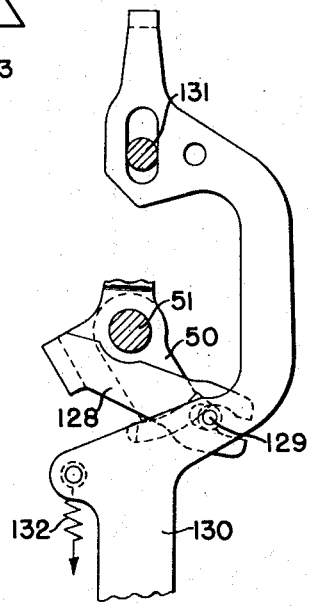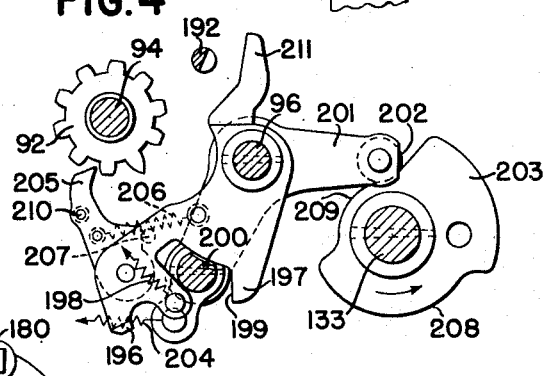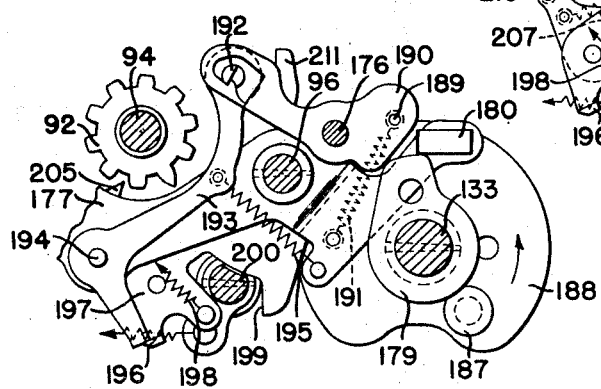

Aug. 4, 1953
M. A. GOODBAR ET AL
2,647,458
TICKET PRINTING MECHANISM
Filed Aug. 31, 1949
5 Sheets-Sheet 3
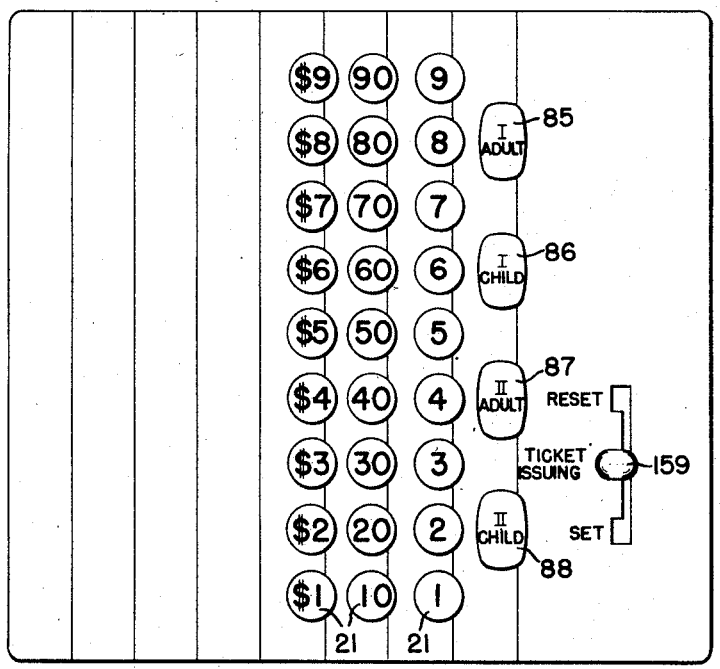
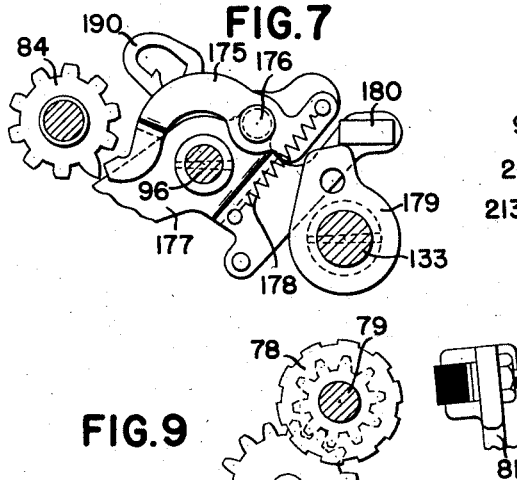
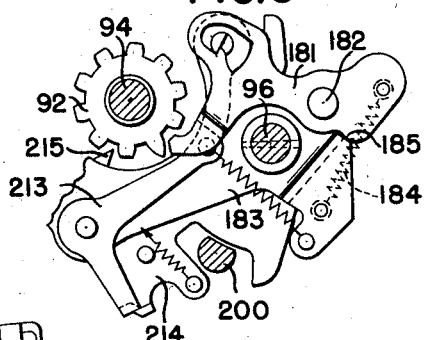
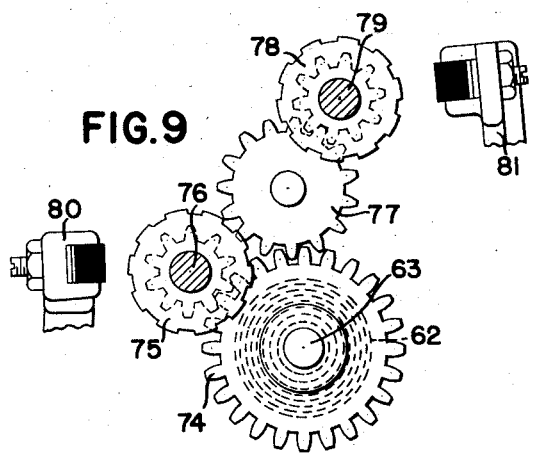
INVENTORS
MAYO A. GOODBAR
RUSSELL G. PRATT
BY *Carl Benst*
THEIR ATTORNEY Aug. 4, 1953

M. A. GOODBAR ET AL 2,647,458

TICKET PRINTING MECHANISM

Filed Aug. 31, 1949

INVENTORS
MAYO A. GOODBAR
RUSSELL G. PRATT

BY *Earl Beust*

THEIR ATTORNEY

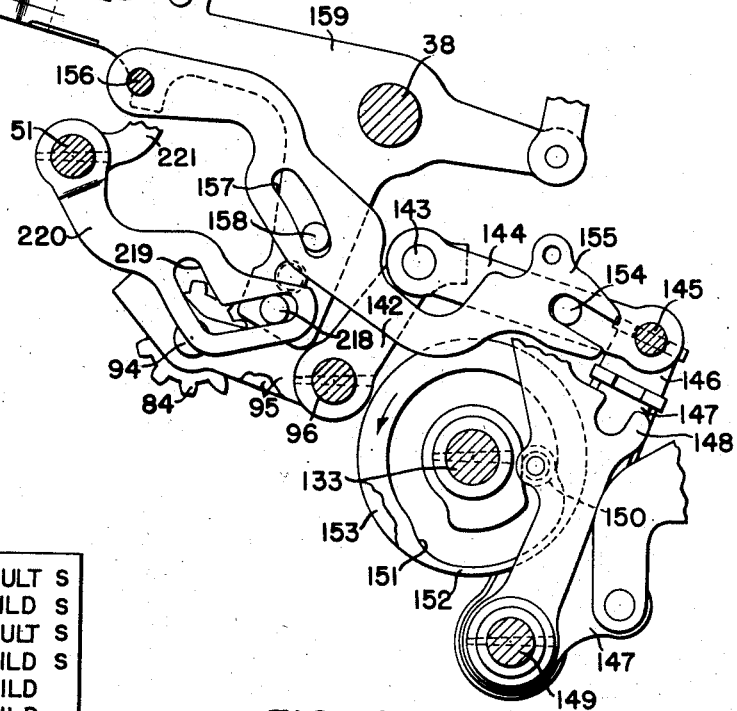

Patented Aug. 4, 1953

2,647,458

UNITED STATES PATENT OFFICE 2,647,458

TICKET PRINTING MECHANISM

Mayo A. Goodbar, Oakwood, and Russell G. Pratt, Dayton, Ohio, assignors to The National Cash Register Company, Dayton, Ohio, a corporation of Maryland Application August 31, 1949, Serial No. 113,404

6 Claims. (Cl. 101—70)

This invention relates to ticket-issuing machines and is particularly directed to a compact and efficient machine for printing and issuing several classes of tickets, and for keeping an accurate count of the number of tickets issued in each class.

There has long been a genuine need for a small, compact, efficient, and easily portable machine for economically printing and issuing tickets of several classes, such a machine being well suited for use by motion picture theaters and other places of amusement in printing and issuing admission tickets, for use by transportation companies in printing and issuing special fare tickets for excursions, and for other similar uses, where several classes of admission or fare tickets are required.

Therefore, one object of the present invention is the provision of a machine for printing and issuing tickets of several classes.

Another object is to provide a machine for printing and issuing several classes of tickets and for keeping an accurate count of the number of tickets issued in each class.

A further object is to provide a machine for printing and issuing several classes of admission tickets, said machine comprising for each class of tickets settable means for controlling the printing of the value of the ticket, and means for counting the number of tickets issued in each class, both of said means being mounted on a common axis.

With these and incidental objects in view, the invention includes certain novel features of construction and combinations of parts, a preferred form or embodiment of which is hereinafter described with reference to the drawings which accompany and form a part of this specification.

In the drawings:

Fig. 2 is a side elevation of the control keys for controlling the issuing of the four classes of tickets.

Fig. 3 is a detail view of a portion of the machine releasing or starting mechanism.

Fig. 4 is a detail view in side elevation of the mechanism for advancing the wheels of the ticket counting devices.

Fig. 5 is a side elevation of the mechanism for transferring tens digits from lower to higher order in the ticket counting devices.

Fig. 6 is a diagrammatic plan view of the keyboard of the machine.

Fig. 7 is a right side elevation of the zero stop mechanism for the highest order storage wheels.

Fig. 8 is a right side elevation of the zero stop mechanism and the tens transfer mechanism for one order of the counting wheels.

Fig. 9 is a right side elevation showing the mechanism for connecting the differential mechanism with the two lines of type wheels for printing similar information on an issuing ticket and on a detail audit strip.

Fig. 12 is a right side elevation of the machine control lever and the mechanism associated therewith.

Fig. 13 illustrates several fragmentary portions of a detail strip prepared by the machine of this invention.

Fig. 14 is a facsimile of one of the four classes of tickets printed and issued by the machine of this invention.

General description

Figure 1:
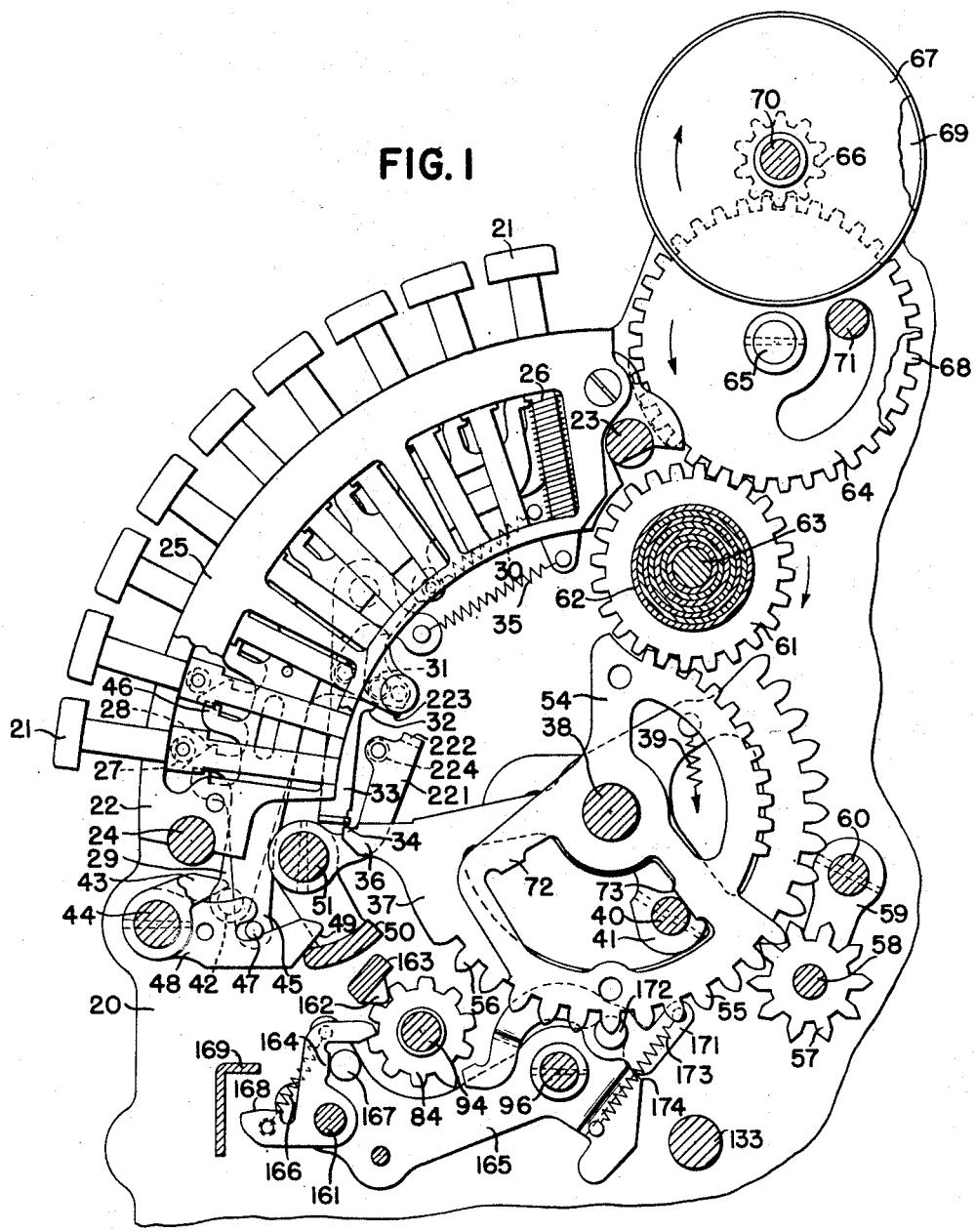
Fig. 1 is cross-sectional view of the main portion of the machine, taken just to the right of one of the value or price setting banks, and shows said bank and the differential mechanism associated therewith.

The present invention is directed to a small, efficient, and compact machine for printing and issuing several classes of tickets, for use as admission tickets to theaters or other places of amusement, commuters' tickets, short run or special excursion tickets, and many other special uses where an easily and readily portable machine is required or desirable for printing and issuing several classes of tickets.

As presently constructed, the machine is arranged to print and issue four classes of tickets and simultaneously keep an accurate record of the tickets issued in each class, so that at the end of a business period an authorized person may quickly ascertain the total number of tickets issued in each class and the total values of each of said classes of tickets.

Broadly, the machine comprises a combined value-setting or storage device and a counting or accumulating device for each class of tickets, the two devices for each class of tickets being mounted on a common, horizontal axis. Three denominational rows of keys are provided for entering ticket values or prices in the storage devices, and a control key is provided for each class of tickets, for selecting the corresponding storage and counting devices for actuation and for simultaneously releasing the machine for operation. A manually movable control lever is provided for controlling the functions of the machine.

The machine is provided with two similar sets of printing wheels, one for printing data upon the issuing tickets and the other for printing similar data upon a detail audit strip, and each of said sets has wheels thereon corresponding to the storage devices, the counting devices, the four control keys, and the control lever, and the positioning of said printing wheels is controlled thereby for recording corresponding data upon the issuing tickets and the detail strip. The three rows of price keys also control corresponding front and back indicators for indicating the values of the depressed keys in value-setting operations and for indicating the value of the class of tickets issued in ticket-issuing operations. The four control keys also control the positioning of corresponding front and back indicators for indicating the class of ticket being issued.

The control lever has three positions; namely, "Set," "Ticket Issuing," and "Reset." When the lever is in "Set" position, the price keys may be used in conjunction with the four control keys to enter the prices of the four classes of tickets in the corresponding sets of storage devices. When the lever is in the "Ticket Issuing" position, the control keys may be used to select the corresponding sets of storage devices for controlling the printing of the prices and other pertinent data on the issuing tickets and the detail strip. When the control lever is in "Reset" position, the four control keys may be used for selecting the corresponding sets of storage and counting devices for resetting and for simultaneously initiating operation of the machine, during which said corresponding storage and counting devices are reset to zero and the values therein are recorded upon the detail strip.

The mechanism described in general above, which is pertinent to a proper understanding of the present invention, will be described in detail in the ensuing pages. For a complete disclosure of mechanism not described in detail herein, reference may be had to United States Patents Nos. 1,929,652, 2,048,200, and 2,056,485, issued to William H. Robertson, October 10, 1933, July 21, 1936, and October 6, 1936, respectively.

*Detailed description*

The mechanism of the machine chosen to illustrate the present invention is supported between right and left main frames 20, only the left frame being shown here (Fig. 1), said frames being supported in spaced relationship to each other by a machine base (not shown), to which they are secured, and by various cross frames, tie rods, shafts, and bars. A suitable cabinet (not shown) is provided for enclosing the mechanism of the machine.

*Price setting mechanism*

The present machine is provided with three denominational rows of price-setting or amount keys 21 (Fig. 1) depressibly mounted in a key frame 22, having notches which engage corresponding supporting rods 23 and 24, in turn supported by the frames 20. Turning the upper rod 23 to a position where a flat portion thereof is in proper relationship with the corresponding slot in said key frame 22 permits said frame to be readily lifted out of the machine, in case it is desirable or necessary. The keys 21 are retained in their respective slots in the frame 22 by a cover plate 25, which is secured to said frame by suitable screws. Each key 21 is provided with a compressible spring 26, which urges said key upwardly to normally maintain it in undepressed position, as shown here. Each of the keys 21 carries a stud 27, which coacts with an angular camming surface 28 on a corresponding hook carried by a detent plate 29, shiftably mounted in the key frame 22.

Depression of any one of the keys 21 causes the stud 27 therein, in cooperation with the camming surface 28, to shift the detent 29 downwardly or counter-clockwise against the action of a spring 30 until a flat surface on said stud by-passes a shoulder formed on the corresponding hook 28, whereupon the spring 30 partly returns said detent clockwise to move said shoulder over the flat surface to retain the depressed key 21 in depressed position. The keys 21 are flexible in their action; that is, the depression of a second key 21, after one key has been depressed, shifts the detent 29 counter-clockwise to release the previously depressed key, and so on. The detent 29 (Fig. 1) carries a stud 31, which coacts with a camming lug 32 on a zero stop arm 33 pivoted on a stud in the frame 22. A spring 35 urges the arm 33 rearwardly or counter-clockwise, and, when no key 21 is depressed, the stud 31, in cooperation with the lug 32, positions the arm 33 so that a bent-over ear 34 on its lower end is in the path of and directly above a forward extension 36 on an actuator segment 37 for this particular row of keys. The actuator 37 is free on a shaft 38 journaled in the right and left frames 20, and a comparatively strong spring 39 urges said actuator 37 clockwise to normally maintain a finished surface, in an opening therein, in contact with an actuator operating rod 40, supported by two arms 41 (only one shown here) in turn secured on the shaft 38. Through mechanism not shown here, but well known in the art, the shaft 38, the arms 41, and the rod 40 are oscillated or rocked first in a clockwise direction and then back to normal position, during machine operation, to operate the actuator 37 and the printer and indicator positioning mechanism associated therewith, as will be explained presently.

A downward extension of the detent 29 (Fig. 1) carries a stud 42, which underlies a finger 43, secured on a key release shaft 44 journaled in the machine framework. Near the end of machine operation, the shaft 44 and the finger 43 are rocked clockwise in the usual manner, whereupon said finger, in cooperation with the stud 42, shifts the detent 29 downwardly against the action of the spring 30 to disengage the shoulder on the hook 28 from the flat portion of the stud 27 in the depressed key 21, to release said key to the action of the spring 26, which immediately restores said key upwardly to undepressed position. In addition to the automatic means for releasing the depressed keys 21, the usual manual means (not shown) is provided for rocking the shaft and the finger clockwise to release said depressed keys.

Mechanism is provided for locking the depressed key 21 against release and for locking the undepressed keys 21 against depression during machine operation. This mechanism includes a locking plate 45, shiftably mounted adjacent the corresponding detent 29 and having a hook 46 for each of the keys 21, which hooks coact with the corresponding studs 27 in said keys. A downward extension of the plate 45 carries a stud 47 engaged by a slot in an arm 48 free on the shaft 44. The arm 48 has a camming surface 49, which coacts with a rounded edge on the bail of a key lock and machine release yoke 50 free on a shaft 51 journaled in the frames 20. At the beginning of machine operation, the yoke 50 is rocked clockwise, causing its rounded edge, in cooperation with the surface 49, to rock the arm 48 upwardly or counterclockwise, which movement, through the slot therein, in cooperation with the stud 47, shifts the locking plate 45 clockwise to move the hooks 46 beneath the corresponding studs 27 in the undepressed keys 21 and to move the hook 46 above the flat surface of the stud 27 in the corresponding depressed key 21, to lock all of said keys 21 against manipulation during machine operation.

Near the end of machine operation, the bail 50 (Fig. 1) is restored counterclockwise to normal position and the locking plate 45 is simultaneously spring-restored downwardly to move the hooks 46 out of coacting relationship with the studs 27.

Associated with the actuator 37 is a printer and indicator positioning segment 54, free on the shaft 38 and having an opening therein, similar to the opening in the actuator 37, through which extends the operating rod 40. The segment 54 has gear teeth 55, and the actuator 37 has similar teeth 56, which are engaged by the teeth of a corresponding coupling pinion 57 to provide a medium through which the positioning of said actuator 37 is transmitted to the segment 54. The coupling pinion 57 is rotatably supported on a rod 58, which extends between two similar arms 59 (only one shown here) in turn secured on a shaft 60 journaled in the machine framework.

The segment 54 has gear teeth, which mesh with similar gear teeth in a gear 61 secured to one end of a corresponding tube 62, which, with similar nested tubes, is supported on a shaft 63 journaled in the main frames 20. The gear 61 meshes with and drives an intermediate gear 64 secured on a shaft 65 journaled in the main frames 20, and said gear 64 in turn meshes with and drives a pinion 66 and a corresponding roller-type front indicator 67 integral therewith. The indicator 67 has thereon data corresponding to the data on the keys 21, and said data is visible through a suitable opening in the front of the machine cabinet.

Also secured on the shaft 65 is a second intermediate gear 68, similar to the gear 64, which meshes with a pinion, not shown but similar to the pinion 66, which pinion is in turn secured to a back indicator 69, which is a companion to the front indicator 67 and has similar data on its face, which is visible through a suitable opening in the rearward portion of the machine cabinet.

The indicators 67 and 69 are rotatably supported on a shaft 70 journaled in the main frames 20. The gears 64 and 68 (Fig. 1) have similar concentric slots therein, through which extends a stop rod 71 supported by the frames 20, said rod coacting with said slots to stop said gears and their corresponding indicators 67 and 69 at the extent of their movement in either direction.

At the beginning of machine operation, the pinion 57 (Fig. 1) is rocked counterclockwise out of engagement with the teeth 55 and 56 of the segment 54 and the actuator 37, immediately after which the operating rod 40 begins its clockwise initial movement, during which movement the actuator 37 is positioned and the segment 54 and the mechanism connected thereto, including the indicators and the type wheels, as will be explained presently, are restored from their preset positions to zero positions.

The spring 39 causes the actuator 37 to move in unison with the rod 40 during its initial movement. However, if no price-setting key 21 has been depressed, the zero stop arm 33 remains in the path of the extension 36 of said segment and stops said segment in zero position. Depression of any one of the keys 21, as previously explained, causes the stud 27 therein to shift the detent 29 downwardly, causing the stud 27 therein, in cooperation with the lug 32, to rock the zero stop arm 33 clockwise to move the ear 34 out of the path of the extension 36 to free the actuator 37 for positioning movement under influence of the depressed key 21. In this case, the actuator 37, powered by the spring 39, follows the rod 40 during its clockwise movement until the extension 36 strikes the lower end of the stem of the depressed key 21 to position said actuator according to the value of said depressed key. Likewise the rod 40, during its initial movement, engages a finished surface 72 in the opening in the segment 54 and restores said segment and the parts connected thereto, including the indicators 67 and 69, from their preset positions to zero positions.

After the rod 40 has completed its initial clockwise movement and is dwelling in moved position, the coupling pinion 57 is reengaged with the teeth 55 and 56 to couple the parts 37 and 54 together for unitary movement. Counterclockwise return movement of the operating rod 40 causes said rod to engage a finished surface 73 in the opening on the actuator 37 and positively return said actuator against the action of the spring 39 to zero position. Inasmuch as the segment 54 is coupled to the actuator 37, return movement of said actuator carries said segment and the parts connected thereto, including the indicators 67 and 69 and the corresponding type wheels, a distance corresponding to the positioning of said actuator under influence of the depressed key 21 to position the indicators and the type wheels to the value of said depressed key 21.

The differential positioning of the segment 54 is transmitted to the corresponding type wheels through the corresponding one of the nested tubes 62 (Figs. 1 and 9), one end of which is secured to the gear 61, the other end being secured to a similar gear 74, which meshes with and drives a gear secured to a corresponding type wheel 75 free on a rod 76, said wheel corresponding to the keys 21 and arranged to record the value of said keys upon a detail strip 82, fragments of which are shown in Fig. 13. The gear 74 likewise meshes with and drives an intermediate gear 77, which in turn meshes with a gear secured to a type wheel 78 free on a rod 79, said type wheel arranged to print values corresponding to the keys 21 upon an issuing ticket 83, a facsimile of which is shown in Fig. 14. The rods 76 and 79 are secured in a printer framework, not shown.

Through the train of gearing shown in Figs.

1 and 9, the differential positioning of the segment 54 is transmitted to the corresponding type wheels 75 and 78, and, after said type wheels have been positioned, corresponding impression hammers 80 and 81 function in the usual manner to record the value of the depressed key 21 upon the detail strip 82 and the ticket 83 (Figs. 13 and 14).

As previously explained, there are three denominational orders or banks of the price setting keys 21, and each of the banks comprises mechanism similar to that shown in Figs. 1 and 9 and explained above.

Storage and counting devices

The present machine is provided with four sets of storage wheels 84 (Figs. 1 and 11), comprising one wheel for each of three denominational orders, corresponding to the three rows of setting keys 21, said wheels being arranged in three denominational groups, each comprising four wheels, or one wheel for each set. The four sets of storage wheels 84 are selected for engagement with the corresponding actuators 37 by means of four control keys 85, 86, 87, and 88 (Fig. 10), which are slidably mounted in a key frame 89, similar to the frame 22 (Fig. 1) for the keys 21 and supported on the rods 23 and 24, the same as said frame. The storage wheels 84 have teeth corresponding to the teeth 56 (Fig. 1) in the actuators 37, and, after said actuators have been positioned under influence of the depressed keys 21 in price setting operations, as explained before, said wheels are rocked into engagement with said teeth 56, and return movement of the operating rod 40 causes the actuators 37 to rotate said wheels 84 a distance corresponding to the value of the depressed keys 21 to enter in said selected set of storage wheels the value or price of the class of tickets represented by the control keys 85 to 88 inclusive.

In ticket issuing operations, the selected set of wheels 84 are engaged with the corresponding actuators 37 prior to their initial movement, which movement rotates said wheels in a reverse direction to zero to position said actuators according to the values stored in said wheels. The actuators then, in their return movement, position the indicating and printing mechanism according to the values stored in said wheels 84 and simultaneously restore said wheels from zero to their original condition, in readiness for another ticket issuing operation.

In resetting operations, the selected set of wheels 84 are engaged with the actuators 37 prior to their initial movement, which movement rotates said wheels to zero, to position said actuators according to the values stored in said wheels, and said selected set of wheels are disengaged from said actuators prior to their return movement and thus remain in zeroized condition. The return movement of the actuators 37 positions the corresponding indicators and type wheels according to the values cleared from said wheels.

In addition to the three sets of storage wheels 84 (Fig. 11), there are also four sets of ticket counting wheels 92 for keeping an accurate count of the total number of tickets issued in each of the four classes, and these four sets of ticket counting wheels 92 are selected by the keys 85 to 88 inclusive for actuation, as will be explained presently.

Each of the four sets of wheels 92 comprises a wheel for each of four denominational orders, and there are a corresponding actuator 37 and segment 54 for each order, similar to and functioning like the ones shown in Fig. 1, to position the corresponding type wheels 75 and 78 (Fig. 9) to print the number on the ticket and on the detail strip, as will be fully explained presently.

The four sets of storage wheels 84 and the four sets of counting wheels 92 are rotatably supported on a common horizontal axis comprising a tube 93, slidably mounted on a rod 94 (Figs. 11 and 12), opposite ends of which are secured to the outer ends of corresponding arms 95, the inner ends of said arms being secured to an engaging shaft 96, journaled in the main frames 20.

Selecting mechanism for the storing and counting devices

The parts described above, including the shaft 96, the arms 95, and the rod 94, form a framework, which is rockable back and forth, in a manner presently to be described, to engage the selected set of storage wheels 84 and the selected set of counting wheels 92 with the corresponding actuators 37. Likewise, the tube 93 is shiftable horizontally upon the rod 94 to aline the selected sets of storage and counting wheels 84 and 92 with the corresponding actuators and to simultaneously aline the lowest order counting wheel 92 of the selected set with the mechanism which automatically advances said wheels one step each time a ticket is issued and which functions in a manner to be described presently.

The enlarged right-hand end of the tube 93 (Fig. 11) has therein an annular shifting groove 97, which is engaged by a shifting extension 98 (Fig. 10) on a shifting slide 99 free on a stationary stud 100. The slide 99 has an arcuate portion 101, which snugly embraces the periphery of a drum shifting cam 103 free on the shaft 96, and said cam has in its periphery a spiral shifting groove 104, which engages a stud 105 extending from the lower portion of the arcuate surface 101 in the slide 99.

Secured to the drum cam 103 (Fig. 10) is a crank 106 carrying a stud 107 embraced by a slot in a downwardly extending arm of a bell crank 108 free on the shaft 38. A forwardly extending arm of the bell crank 108 carries a stud 109 engaged by the bifurcated rear end of an arm 110 free on a stud 111 secured in the frame 89 (Fig. 2) for the control keys. The arm 110 (Fig. 10) carries a stud 112 pivotally engaged by the lower end of a totalizer selecting plate 113, the other end of which plate is pivotally connected at 114 to an arm 115 pivoted on a stud carried by the frame 89 (Fig. 2). It is therefore evident that the selecting plate 113 is shiftably supported by the arms 110 and 115. The selecting plate 113 has four V-shaped shifting notches 117 to 120 inclusive, which coact with shifting studs 121, one of which is carried by each of the keys 85 to 88 inclusive.

Figure 10:
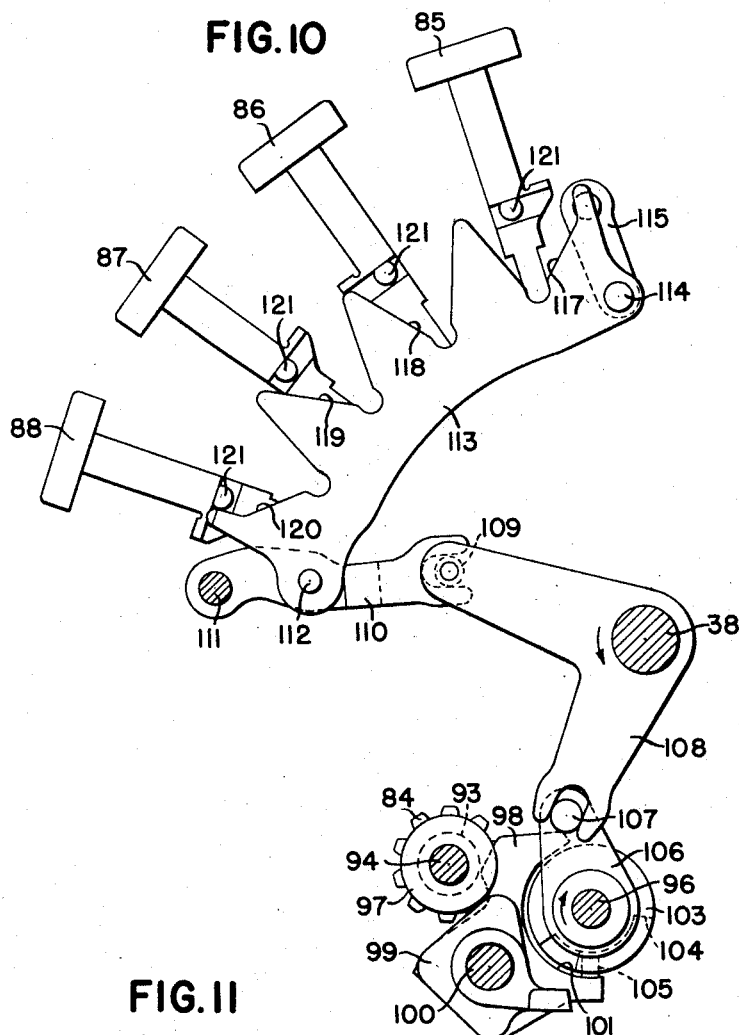
Fig. 10 is a right side elevation of the four control keys for controlling the issuing of the four classes of tickets.
Figure 11:
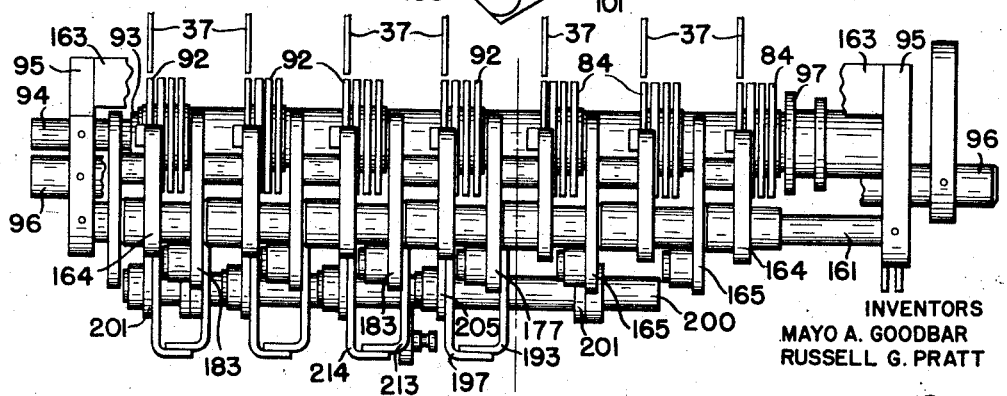
Fig. 11 is a longitudinal view of the four sets of combined storing and counting devices for storing the values of each of the four classes of tickets, and for counting the number of tickets issued in each of the four classes.

In Fig. 10, the parts are shown in the position which they would occupy if positioned by depression of the control key 85; that is, the bottom of the shifting notch 117 is in alinement with the stud 121 in said key, and this would cause the cam 103 to position the slide 99 and the tube 93 (Figs. 10 and 11) so that the right-hand set of storage wheels 84 and the corresponding set of counting wheels 92 would be in alinement with the corresponding actuators 37. Depression of the key 86 would cause the stud 121 therein, in cooperation with the shifting notch 118, to shift the selecting plate 113 downwardly a slight distance, from the position shown here, to rock the arm 110 clockwise, to cause said arm in turn to rock the bell crank 108 counter-clockwise to revolve the cam 103 a slight distance clockwise, whereupon the shifting groove 104 shifts the slide 99 and the tube 93 one step toward the right, as viewed in Fig. 11, to aline the second set of storage wheels 84 and the corresponding set of counting wheels 92 with the corresponding actuators 37. Depression of the control key 87 causes the shifting groove 104 to shift the slide 99 and the tube 93 the proper extent to aline the third set of wheels with the actuators 37, and depression of the control key 88 causes the stud 121, in cooperation with the shifting notch 120, to revolve the shifting cam 103 its full extent of movement in a clockwise direction, to cause the slide 99 to aline the fourth or extreme left-hand set of wheels with the corresponding actuators 37, as shown in Fig. 11.

*Machine release mechanism*

In addition to selecting the corresponding sets of wheels of the storage device and the counting device, the control keys 85 to 88 inclusive likewise initiate operation of the machine, such keys being sometimes referred to as "motorized" control keys. For the purpose of initiating machine operation, the studs 121 (Fig. 2), carried by the keys 85 to 88, coact with corresponding shifting slots 122 in a machine release plate 123, shiftably mounted by means of slots therein, in cooperation with screw studs in the frame 89, said plate being normally maintained in its upward position, as shown here, by a spring 124, which yieldingly maintains extensions of one wall of said slots 122 in contact with the corresponding studs 121.

Depression of any one of the control keys 85 to 88 causes the stud 121 therein, in cooperation with the corresponding slot 122, to shift the release plate 123 downwardly or counter-clockwise against the action of the spring 124. Downward movement of the plate 123 causes a stud 125 in a downward extension thereof, in cooperation with a slot in the upper surface of a release arm 126 free on the shaft 44, to rock said arm clockwise. Clockwise movement of the arm 126 moves an abutting surface 127 on its inner end out of the path of the bail of the yoke 50 to free said yoke for clockwise releasing movement. The yoke 50 has a right-hand arm 128 (Fig. 3) with a slot which engages a stud 129 in a machine release bar 130 mounted to shift vertically by means of a slot in its upper end in cooperation with a stationary stud 131 and by means of a similar slot (not shown) in its lower end, in cooperation with a similar stationary stud (not shown). A spring 132 is tensioned to shift the bar 130 downwardly, and, after the surface 127 has been moved out of the path of the bail of the yoke 50, said spring 132 shifts said bar downwardly and simultaneously rocks the yoke 50 clockwise to engage the clutch mechanism for the machine operating motor, and to simultaneously close the switch which energizes said motor, causing it to revolve a main cam shaft 133 (Fig. 12), journaled in the frames 20, in a counter-clockwise direction.

When the main cam shaft 133, and the parts assembled thereon, near the end of one counter-clockwise revolution, the bar 130 (Fig. 3) is restored upwardly to disengage the clutch mechanism and to open the motor switch and thus terminate machine operation. Upward movement of the bar 130 restores the yoke 50 counterclockwise until the front edge of its bail moves beyond the end of the arm 126 (Fig. 2), whereupon the spring 124 restores the plate 123 and said arm 126 upwardly to normal position, as shown here, in which the abutting surface 127 is again in the path of the bail of said yoke 50, to hold said yoke against releasing movement and thus condition the machine for a subsequent operation.

Clockwise releasing movement of the yoke 50 causes its bail to move above the inner end of the arm 126 to retain said arm and the plate 123 in their downward positions during machine operation. Retaining the plate 123 in its downward position causes the slot 122, in cooperation with the corresponding stud 121, to retain the corresponding control keys 85–88 depressed during machine operation.

*Non-repeat mechanism*

A non-repeat pawl 134 (Fig. 2) is provided for preventing repeat operations of the machine in case one of the control keys 85 to 88 is retained depressed at the end of machine operation. The pawl 134 is free on the shaft 44 and is flexibly connected to the arm 126 by a spring 135, tensioned between a stud in said pawl 134 and a stud 136 in the arm 126. The pawl 134 has a shoulder 137, which extends inwardly farther than the surface 127 of the arm 126 and normally rests on an upper surface 138 of the bail of the yoke 50. When the yoke 50 is released to the action of the spring 132 (Fig. 3) by downward movement of the arm 126, the surface 138 of the bail of said yoke moves beneath the non-repeat pawl 134 and retains said pawl in ineffective position, as shown here.

When the yoke 50 is restored counter-clockwise, the forward edge of its bail is moved a slight distance beyond the shoulder 137; however, under normal conditions, restoring movement of the arm 126 causes the stud 136 to lift said shoulder above said bail, so that said bail may come to rest against the surface 127, as shown in Fig. 2.

In case one of the control keys 85–88 is retained depressed at the end of machine operation and the arm 126 is thus prevented from returning into the path of the yoke 50, the restoration of the bail of said yoke beyond the shoulder 137 permits the tensioned spring 135 to immediately rock the pawl 134 clockwise until a finger 139 thereon contacts the surface 138, to move said shoulder 137 into the path of said bail to obstruct releasing movement thereof and thus prevent a repeat operation. When the depressed control key is released, upward movement of the plate 123, by the spring 124, restores the arm 126 into the path of the yoke 50, and during this restoration the stud 136 engages the pawl 134 and carries said pawl in unison therewith to move the shoulder 137 above the bail of the yoke 50 and thus restore the parts to unreleased position, as shown in Fig. 2.

The electric motor and clutch mechanism for operating the machine chosen to illustrate the present invention is not shown herein, and further disclosure of said mechanism is believed unnecessary, as it is of conventional design and is well known in the art.

The control keys 85 to 88 inclusive (Figs. 2, 6, and 10) are located on the right-hand side of the keyboard adjacent the units order of setting keys 21, and said keys have an actuator 37 (Fig. 1) and a setting segment 54 similar in every respect to those described in connection with said keys 21, which, through a gear similar to the gear 61 (Figs. 1 and 9) and one of the nested tubes 62 and associated gearing, positions the corresponding indicator and corresponding type wheels on rods 76 and 79 for indicating and recording data corresponding to the class of ticket represented by said control keys, said record being printed simultaneously on the detail strip 82 (Fig. 13) and the issuing ticket 83 (Fig. 14).

*Engaging mechanism for storage and counting devices*

After the selected set of wheels 84 and 92 have been alined with the corresponding actuators, said wheels are engaged with and disengaged from said actuators in proper timing for the type of operation being performed, and the mechanism for controlling the engaging and disengaging of said wheels and the actuators is shown best in Fig. 12 and will now be described.

Secured on the engaging shaft 96 is an arm 142 having a stud 143, to which is pivoted the forward end of a link 144, the other end of which link carries a stud 145, which coacts with engaging slots in bent-over ears of engaging arms 146 and 147 and with a slot in the upper end of an engaging arm 148. The arms 146 and 147 are free on a shaft 149 journaled in the main frames 26, while the arm 148 is secured on and rocks said shaft, which in turn, through a linkage connection (not shown) rocks the shaft 60 (Fig. 1), the arms 59, and the coupling pinions 57 back and forth in proper timing to engage and disengage said coupling pinions and the teeth 55 and 56 in the manner explained earlier herein. The arm 148 carries a roller 150, which engages a camming groove 151 in the right-hand face of a box cam 152, while the arm 147 carries a roller (not shown) which engages a camming groove in the left-hand face of said cam 152. The arm 146 carries a roller (not shown) which engages a camming groove in one face of a box cam 153, said cams 152 and 153 being secured on the main cam shaft 133 and receiving one counter-clockwise revolution each machine operation to rock the arms 146, 147, and 148 back and forth, to engage and disengage the wheels 84 and 92 and the corresponding actuators 37 in proper timing for the type of operation being performed.

The link 144 (Fig. 12) carries a stud 154, which engages a slot in the rear end of a lever 155, pivoted at its forward end on a stud 156 in the right frame 26. The lever 155 has a cam slot 157 engaged by a stud 158 in an operation control lever 159 (Figs. 6 and 12) rotatably supported on the actuator shaft 38. The forward end of the control lever 159 protrudes through a proper opening in the machine cabinet and has a convenient finger piece 160 for moving said lever to any of its three positions; namely, "Set," "Ticket Issuing," and "Reset."

When the lever 159 is in "Set" position, as shown in Fig. 12, the stud 158, in cooperation with the slot 157, causes the lever 155 to position the link 144, as shown here, in which position the stud 145 is in engagement with the slot in the bent-over ear of the arm 146. During operation of the machine, the arm 146 rocks the selected set of storage wheels 84 into engagement with the teeth 56 (Fig. 1) of the actuators 37, after said actuators have been positioned under influence of the corresponding setting keys 21, whereupon return movement of said actuators revolves said wheels in a clockwise direction a distance corresponding to the value of the depressed setting keys 21 to enter said value in said wheels. After the actuators 37 have completed their return movement, and near the end of machine operation, the arm 146 rocks the selected set of wheels 84 out of engagement with the teeth 56.

In price setting operations, the set of counting wheels 92 corresponding to the selected set of storage wheels 84 are engaged with their actuators 37; however, this is an idle movement and is of no importance, as no keys are provided for entering values in said counting wheels. However, in ticket issuing and reset operations, the selected set of wheels 92 coact with their actuators to transmit the values on said wheels to the corresponding printing wheels, as will be explained presently.

All except the selected sets of wheels 84 and 92, which are in alinement with the actuators 37, are maintained in set position by an alining rail 162 (Figs. 1 and 11) on a bar 163 extending between the rockable framework for said wheels. Properly spaced slots are provided in the rail 162 to provide turning clearance for the selected sets of wheels 84 and 92.

The selected sets of wheels 84 and 92 are maintained in alinement when they are disengaged from the actuators 37 (Fig. 1) by corresponding alining pawls 164, rotatably mounted on a rod 161 supported by the arms 95 (Fig. 11). Inasmuch as all of the pawls 164 are similar in outline and function alike, the one shown in Fig. 1 will be described as representative of all of said pawls.

A spring 166, tensioned between the pawl 164 and an arm 165 fast on the shaft 96, urges said pawl in a clockwise direction, into engagement with a stop stud 167 carried by said arm 165, to normally maintain a nose on said pawl in engagement with a tooth space of the corresponding selected wheel 84 to restrain said wheel from rotation when it is disengaged from the actuator 37. The arm 165 and the rod 161 rock in unison with the shaft 96 as the selected sets of wheels 84 and 92 are engaged with the actuators 37, and such clockwise movement of the rod 161 causes a surface 168 on a forwardly extending portion of the pawl 164 to engage the bottom surface of an angle bar 169 to rock said pawl out of engagement with the teeth of the corresponding wheel 84 at the same time said wheel is meshing with the teeth 56 of the actuators 37, so that said wheel will be free to revolve under influence of said actuator.

In ticket issuing and reset operations, it is necessary that none of the keys 21 (Fig. 1) be depressed, and it is also necessary that said keys be locked against depression. Moreover, it is necessary that the zero stop arms 33 be rocked to ineffective position, so that the actuators 37 will be free for positioning movement.

These conditions are effected by movement of the control lever 159 (Fig. 12) to either "Ticket Issuing" or "Reset" position, which causes a stud 218 therein, in cooperation with a cam slot 219 in an arm 220 fast on the shaft 51, to rock said arm and said shaft counter-clockwise. Secured on the shaft 51 and moving in unison therewith is an arm 221 (Fig. 1) for each row of keys 21, and each arm has a bent-over ear 222, which moves beneath a corresponding pawl 223 mounted on each of the detents 29. This obstructs downward movement of the detents 29 and thus locks the keys 21 against depression. When a key 21 is depressed, the corresponding detent 29 is shifted downwardly to move the corresponding pawl 223 into the path of the ear 222 to obstruct counter-clockwise movement of the arm 221, the shaft 51, and the arm 220 (Fig.

12) to prevent movement of the control lever 159 to "Ticket Issuing" or "Reset" position until said key is released.

Each of the arms 221 carries a stud 224, which, upon counter-clockwise movement thereof, engages and rocks the corresponding zero stop arm 33 clockwise to ineffective position to free the corresponding actuators 37 for positioning movement.

There is a zero stop arm (not shown) similar to the arm 33 (Fig. 1) for each denominational order of the counting wheels 92 to stop the corresponding actuators 37 in zero position in setting operations, and these arms are rocked to ineffective position in "Ticket Issuing" and "Reset" operations by corresponding arms (not shown) similar to the arms 221, so that the corresponding actuators 37 may be positioned under influence of the selected set of counting wheels 92, as will be explained presently.

Moving the control lever 159 (Figs. 6 and 12) one step upwardly or clockwise to "Ticket Issuing" position causes the stud 158, in cooperation with the slot 157, to rock the lever 155 and the link 144 clockwise to move the stud 145 into engagement with the slot formed by the bent-over portion of the arm 147. Engaging and disengaging movement of the arm 147 causes the selected set of storage wheels 84 and the selected set of ticket counting wheels 92 (Fig. 11) to be engaged with the corresponding actuators 37 at the beginning of machine operation and prior to clockwise initial movement of said actuators. Initial movement of the actuators 37 rotates the selected wheels reversely until long teeth carried by said wheels contact zero stop means, presently to be described, which locate said wheels in zero position and position the actuators 37, the corresponding indicators 67 and 69, and the corresponding type wheels 75 and 78 (Figs. 1 and 9) in accordance with the values on said wheels, after which operation of the impression hammers 80 and 81 (Fig. 9) causes the price and the consecutive number to be recorded upon the issuing ticket and the detail strip.

As previously explained, in the present adaptation of the machine, there are three orders of value storing wheels 84 corresponding to the three banks of value setting keys 21 for setting up the prices of the various classes of tickets, and, beginning with the lowest order, these three banks of keys and their corresponding wheels 84 represent units of cents, tens of cents, and units of dollars. When the units and tens of cents storage wheels 84 (Fig. 1) arrive in zero position while being rotated in a reverse direction, a long tooth thereon contacts a stop surface on a stop pawl 171 pivoted on a stud 172 carried by the arm 165. A spring 173 urges said pawl in a clockwise direction to normally maintain a lower surface thereon in engagement with a stop shoulder 174 on the arm 165 to properly locate said pawl in relation to the teeth of the corresponding wheel 84.

While there is no reason why the units and tens of cents wheels 84 should ever pass through zero while traveling in a clockwise or setting direction, if, however, through mistake or inadvertence this should happen, the long tooth of said wheel will by-pass the corresponding pawl 171 without causing any damage.

The units of dollars storage wheel 84 (Fig. 7) is stopped in zero position while traveling in a reverse direction by the long tooth thereon contacting a stop surface on a stop pawl 175 pivotally mounted on a stud 176 in an arm 177 secured on the shaft 96 and similar in outline to the arm 165 (Fig. 1). A spring 178 urges the pawl 175 clockwise into engagement with a shoulder formed on the arm 177 to maintain the stopping surface on said pawl in proper relationship with the teeth of the wheel 84. The stop pawl 175 is similar in every respect and functions like the pawl 171 for the other two orders of storage wheels 84, with the exception that the spring 178 is located on the opposite side, and its location has been somewhat changed to provide clearance for a locating cam 179 (Fig. 7) secured on the main shaft 133, said cam coacting with a block 180 secured on an extension of the arm 177 to restore said arm, the shaft 96, and other similar arms and other parts on said shaft to disengaged position and maintain them thus at the end of machine operation.

The selected set of counting wheels 92 (Figs. 8 and 11) are stopped in zero position, while rotating in a reverse direction, by the long teeth thereon coming into contact with a stop surface on a corresponding stop and transfer trip pawl 181, pivoted on a stud 182 in a corresponding arm 183 in turn secured on the shaft 96, the arms 183 being similar in outline to the arms 165 and 177 (Figs. 1 and 7) for the storage wheels 84. A spring 184 urges the corresponding pawl 181 clockwise to normally maintain a stop surface thereon in contact with a stop shoulder 185 on the corresponding arm 183 to maintain said pawls in proper relationship with the teeth of the wheels 92. Inasmuch as it is necessary for the wheels 92 to pass through zero while traveling in an additive or a counting direction, the flexible pawls 181 permit such movement without causing damage.

As previously explained, in ticket issuing operations the selected sets of wheels 84 and 92 remain in engagement with their corresponding actuators 37 (Fig. 1) during their return movements and are consequently restored to their original positions by return movement of said actuators at the end of such operations.

Moving the control lever 159 (Fig. 12) to "Reset" position causes the stud 158, in cooperation with the slot 157, to position the lever 155 and the link 144 so that the stud 145 carried by said link is in engagement with the shifting slot or notch in the upper end of the arm 148. Initial movement of the arm 148 engages the selected sets of wheels 84 and 92 with the corresponding actuators 37 at the beginning of machine operation and prior to clockwise initial movement of said actuators. Clockwise movement of the actuators reversely rotates the selected sets of wheels 84 and 92 to zero positions in exactly the same manner as explained in connection with ticket issuing operations, which movement positions said actuators according to the value standing on said wheels.

After the actuators have been positioned and while the wheels 84 and 92 are standing in zero position, the arm 148 is restored to disengage said wheels from said actuators to cause said wheels to remain in a zeroized condition. Return movement of the actuators 37 in resetting operations causes the corresponding indicators and type wheels to be positioned according to the values standing on said selected sets of wheels 84 and 92, after which operation of the impression mechanism causes said values to be printed upon the detail strip and the issuing ticket.

Advancing means for the counting devices

As previously explained, there are four sets of the counting wheels 92 corresponding to the four sets of storage wheels 84, said sets of wheels 92 being used as consecutive number or step-by-step counting wheels for counting the total number of tickets issued in each of the corresponding classes. This step-by-step counting is effected by mechanism which advances the units wheel 92, for the selected set of counting wheels, one step each machine operation.

Each time the main cam shaft 133 (Fig. 5) makes a revolution, a roller 187 carried by a cam 188 secured on said shaft wipes a stud 189 in a trip arm 190, free on the stud 176, and rocks said arm counter-clockwise against the action of a spring 191, which normally maintains a lower surface on said arm in contact with a stop shoulder on the arm 177. It will be noted by referring to Fig. 7 that the arm 190 is mounted adjacent the stop pawl 175 on the same stud 176 as supports said pawl 175. Counter-clockwise movement of the arm 190 (Fig. 5) rocks a retaining tooth in an opening in a forward extension thereof out of engagement with a flat surface on a stud 192 carried by a transfer retaining arm 193 pivoted on a stud 194 in the arm 177. This releases said arm 193 to the action of a spring 195, which immediately rocks said arm clockwise to disengage a bent-over ear on a downward extension thereof from a corresponding ear 196 on an arm 197 free on the shaft 96. This releases the arm 197 to the action of a spring 198, which immediately rocks said arm 197 clockwise a slight distance until a shoulder 199 formed in an open portion thereof contacts a transfer rod 200, extending between two similar arms 201 (Figs. 4 and 11) in turn free on the shaft 96. Each of the arms 201 carries a roller 202, which cooperates with the periphery of a corresponding plate cam 203 (only one shown here) secured on the main cam shaft 133. A spring 204, tensioned between a crank secured to the rod 200 and a stationary stud, urges said rod and the arms 201 clockwise to normally maintain the rollers 202 in yielding engagement with the corresponding cams 203.

Pivotally mounted on the arm 197 (Figs. 4 and 5) is a feed pawl 205 urged clockwise by a spring 206 to normally maintain a stop shoulder thereon in yielding contact with a stop stud 207 secured in said arm 197. The pawl 205 has a feeding tooth on its upper end arranged to coact with the teeth of the units wheel of the selected set of wheels 92.

At the time the roller 187 (Fig. 5) wipes the stud 189 and releases the arm 197 to the action of the spring 198, medium surfaces 208 of the cams 203 are in contact with the corresponding rollers 202 and position the rod 200 in relation to the shoulder 199 so that only a slight movement of said arm is possible under influence of said spring 198, which movement is not sufficient to effect a feeding and takes place while the selected set of wheels 92 is in engagement with corresponding actuators 37.

After the counting wheels 92 of the selected set have been disengaged from the corresponding actuators 37, continued rotation of the shaft 133 and the cams 203 (Fig. 4) causes the surfaces 208 to ride away from the rollers 202 and presents lower surfaces 209 to said rollers, and this permits the spring 204 to rock the arms 201 and the rod 200 clockwise to the position shown here. The spring 198 causes the arm 197 to move clockwise in unison with the rod 200, and this movement causes the tooth of the pawl 205 to engage a tooth of the units wheel 92 and advance said wheel one step, or the equivalent of one tooth space in an additive direction to add "one" in said units wheel.

A stop stud 210 (Fig. 4) in the transfer pawl 205 engages a stop block (not shown) on the adjacent higher order arm 177 (Fig. 5) to terminate clockwise or advancing movement of said pawl 205 and thus prevent danger of overthrow upon a fast operation of the machine.

At the end of machine operation, the cams 203 are in the position shown in Fig. 4, and at the beginning of the succeeding machine operation said cams impart counter-clockwise movement to the arms 201 and the rod 200, causing said rod, in cooperation with the shoulder 199, to restore the arm 197 counter-clockwise in unison therewith, which movement restores the bent-over ear 196 on said arm beneath the corresponding ear on the retaining arm 197 (Fig. 5). Simultaneously an upwardly extending finger 211 of the arm 197 engages the stud 192 and restores said stud and the retaining arm 193 counter-clockwise until the flat portion on said stud moves beyond the tooth on the trip arm 190, whereupon the spring 191 returns said tooth into the path of the flat portion of said stud to retain said parts in untripped position, as shown in Fig. 5.

When the units wheel 92 of the selected set of counting wheels passes through zero while being advanced in a clockwise direction, as explained above, a long tooth on said wheel (Fig. 8) wipes the tooth of the corresponding transfer trip pawl 181 to rock said pawl counter-clockwise against the action of the spring 184 to disengage a tooth in an opening in said pawl from a flat portion of a stud secured in the upper end of a transfer retaining arm 213, to free a corresponding transfer arm 214 for transferring movement, which movement causes the corresponding transfer pawl 215 to advance the adjacent higher order wheel 92 one step to enter a tens digit therein. After the transfer mechanism shown in Fig. 8 is released, as explained above, it functions exactly like the mechanism shown in Figs. 4 and 5, both in its advancing action and in its restoring action. The remaining higher orders of the ticket counting wheels 92 are provided with a transfer mechanism similar to that shown in Fig. 8 for transferring tens digits thereto from the adjacent lower orders.

Operation

There are many ways in which the machine of this invention may be used to advantage for issuing different classes of tickets; however, a typical example of its use is in connection with a motion picture theater where it is desired to issue four classes of tickets, one for adults and one for children for the matinee period, and one for adults and one for children for the evening period, and such a system of using the machine will be described. However, this system is suggestive only and is used as an example to illustrate the operation of the machine, and it is neither the intention nor the desire to limit the machine to any one particular system or to any particular business, as said machine is very flexible in nature and may be used in many ways where there is a need for printing and issuing tickets of different classes.

In the system being described, the operator should preferably start the business period, such as a day, with the four sets of storage wheels 84 and their companion sets of counting wheels 92 in a cleared condition; then, after moving the control lever 159 (Figs. 6 and 12) to "Set" position, the price of the first class of tickets, 65 cents, (Figs. 13 and 14) is set up on the keys 21, operation of the machine is initiated, and the desired companion sets of storage wheels 84 and counting wheels 92 are selected by depression of the control key 85. During operation of the machine, the price of the ticket (0.65) is entered in the selected set of storage wheels 84 and simultaneously printed as the first entry upon the detail strip 82 (Fig. 13), and the class of tickets, in this case, "I—Adult," is printed to the right of the price, and an identifying letter (S) is recorded immediately to the right of the class of ticket to indicate that the control lever 159 is in "Set" position and that this is a setting operation.

During this preliminary setting operation, the mechanism shown in Fig. 5, including the roller 187, trips the advancing mechanism for the units wheel of the corresponding set of counting wheels 92. However, inasmuch as these wheels have previously been cleared and inasmuch as the advancing of said units wheel takes place at the end of machine operation after printing has been effected, the corresponding printing wheels will not be positioned accordingly until the succeeding operation, and consequently zeros are recorded upon the detail strip 82 for the three lower orders of said counting wheels. It will be noted that instead of a zero the highest order counting wheel causes a minus sign to be printed in zero position to indicate that this is the highest order in which the machine is capable of printing.

Next, the amount or price of the second class of ticket, 25 cents, is set up on the keys 21 (Figs. 1 and 6), and the sets of wheels 84 and 92 corresponding thereto are selected by depression of the control key 86, which also simultaneously initiates machine operation, during which the price of the second class of ticket (0.25) is entered in the storage wheels 84 and recorded upon the detail strip 82 as the second entry (Fig. 13). The control key 86 controls the positioning of the corresponding type wheel, which prints the identity of the class of ticket corresponding thereto (I—Child) on the detail strip to the right of the price, and the control lever again controls the corresponding type wheel to cause the identifying letter (S) to be recorded to the right of the class of the ticket.

In two additional setting operations, the prices of the next two classes of tickets are entered in the corresponding sets of storage wheels 84, and said sets of wheels are selected for actuation by depression of the corresponding control keys 87 and 88 (Figs. 6 and 10), which control keys also simultaneously initiate operation of the machine, during which the prices (0.80) and (0.40) of the two classes of tickets are entered in the corresponding sets of storage wheels 84 and recorded upon the detail strip 82 (Fig. 13) as the third and fourth entries. As in the previous setting operations, explained above, the keys 87 and 88 control the corresponding type wheels to cause the class of tickets (II—Adult and II—Child) to be recorded upon the detail strip 82 to the right of the corresponding prices, and also the identifying letters (S) are recorded to the right of the classes of tickets to identify the type of operations being performed.

During the four preliminary setting operations to enter the prices of the various classes of tickets in the corresponding sets of storage wheels, it is discretionary with the operator, and dependent upon the type of accounting system being used by the theater, whether or not the corresponding tickets 83 (Fig. 14) are printed during such operations, and a conveniently located lever (not shown) is provided for disabling the ticket issuing mechanism, if desirable. If it is not desirable to disable the ticket issuing mechanism, the tickets may be issued and destroyed; however, if desired, the tickets may be retained and used in connection with the detail strip for the corresponding period, for auditing purposes.

After the amounts or prices of the four classes of tickets have been entered in the corresponding storage wheels, the control lever 159 (Figs. 6 and 12) is moved from "Set" position to "Ticket Issuing" position, and suitable locks are provided for locking said control lever in "Ticket Issuing" position, so that only those authorized to do so may move said lever to either of its other two positions. With the lever 159 in "Ticket Issuing" position, all that is required to issue a ticket in any particular class is to depress the corresponding control key 85, 86, 87, or 88. However, each of these control keys is provided with a lock for locking them against depression, and the usual practice is for the one in charge to retain possession of the keys to these locks, and keep the keys locked which are not being used at the particular time. For example, during the matinee period, the I Adult and the I Child keys 85 and 86 would be used to issue tickets for this period and consequently would be unlocked, while the keys 87 and 88 would be locked against depression at this time. During the evening period, the keys 87 and 88, which control the printing of the II Adult and II Child tickets for said period, would be unlocked, and the keys 85 and 86 would be locked against depression.

In issuing the first child ticket for the matiness period, shown as the fifth entry on the detail strip (Fig. 13), the operator depresses the key 86 (Fig. 6), and during operation of the machine the corresponding set of wheels 84 control the positioning of the corresponding type wheels and indicators to cause the price of the ticket (0.25) to be printed upon the detail strip 82 and upon the corresponding tickets 83 (Figs. 13 and 14), and, inasmuch as the units wheel of the corresponding counting wheels 92 was advanced one step in the preceding setting operation, the consecutive number (−001) is simultaneously printed upon the detail strip and the ticket, to the left of the price. During operation of the machine, the mechanisms shown in Figs. 4 and 5 causes the units wheel of the selected set of counting wheels 92 to be advanced the equivalent of one digit at the end of the machine operation, so that in the succeeding operation, which is shown as the sixth entry upon the detail strip 82, the total number of tickets issued in this class will be printed upon said detail strip and upon the corresponding ticket 83.

The seventh entry on the detail strip 82 shows a record of the first adult ticket issued for the morning period, and, the facsimile of the ticket shown in Fig. 14 is the ticket corresponding to this entry. It will be noted that identical records of the ticket transaction are recorded upon both the detail strip 82 (Fig. 13) and the ticket 83. The other lettering upon the ticket 83, including the tax schedule, is printed by electro type mounted upon the ticket feeding cylinder, and the date (Feb. 12) is printed by settable type wheels, also mounted in said feeding cylinder, which is of conventional design and well known in the art.

The center fragmentary portion of the detail strip, shown in Fig. 13, shows the printed record of the first adult and child tickets issued during the evening period, the issuing of said ticket being controlled by depression of the keys 87 and 88, respectively, which, as explained before, select the wheels 84 and 92 corresponding thereto, said wheels in turn controlling the positioning of the corresponding indicators and type wheels for printing the corresponding records upon the detail strip and upon corresponding tickets which are issued simultaneously therewith.

At the end of a business period, such as a day, the manager or other person in charge, who is in possession of the keys for the locks, unlocks the control lever 159 (Fig. 6), moves it upwardly one step to "Reset" position, and initiates the first reset operation by depressing the control key 85, during which operation the companion sets of wheels 84 and 92 corresponding to said control key 85 are selected and reset to zero in preparation for the beginning of another business period.

During this reset operation, the total number of tickets issued in this class (46), the price of each ticket, and the data relating to the control key 85 are printed as the first entry upon the third fragment of the detail strip 82 (Fig. 13). Likewise, moving the control lever 159 to "Reset" position controls the positioning of the type wheels corresponding thereto, to cause an identifying letter (Z) to be printed to the right of the other data upon the detail strip 82. As in the case of the setting operations, it is discretionary with the operator whether or not tickets are issued during the four resetting operations. In some systems, the tickets are issued and used in connection with the portion of the detail strip 82 covering the corresponding business period, as a part of the accounting system.

The machine is provided with the usual step-by-step counter of the Veeder type (not shown) for counting the total number of reset operations performed. Moving the control lever 159 to "Reset" position renders the actuating mechanism for the counter effective, so that said counter will be advanced one step each time the machine is operated with said control lever in "Reset" position, to provide visual means in addition to the printed record on the detail audit strip for determining the total number of reset operations performed.

From the foregoing, it may be concluded that the present invention is directed to a compact and efficient machine of small dimensions for printing and issuing four classes of tickets, for automatically counting each ticket issued in the four classes, and for keeping a duplicate printed record on a detail audit strip of all transactions.

Likewise, the machine is very flexible in that the prices of the various classes of tickets may be readily changed when required, as also may the other data printed on the tickets by the electro cylinder, and, inasmuch as said machine is small and comparatively light, it may be readily and easily transported to any vantage point or locality where it is to be used, this latter being of particular benefit when the machine is to be used for issuing certain classes of excursion tickets and general admission tickets to various sports events, and for other related uses.

While the form of mechanism herein shown and described is admirably adapted to fulfill the objects primarily stated, it is to be understood that it is not intended to confine the invention to the one form or embodiment disclosed herein, for it is susceptible of embodiment in various other forms.

What is claimed is:

1. In a machine for printing and issuing several classes of tickets, the combination of a horizontal axle; a set of denominational storage wheels on the axle for each class of tickets; a set of step-by-step counting wheels on the axle for each class of tickets; actuators for the wheels; printing means positioned by the actuators; denominational rows of keys corresponding to the sets of storage wheels to set up the prices of the various classes of tickets; means to engage and disengage the selected sets of storage and counting wheels and the actuators; means to control the engaging and disengaging means to cause the selected sets of storage and counting wheels to be engaged with and disengaged from the actuators in proper timing in preliminary setting operations to cause the prices of the tickets to be entered in said storage wheels, said control means effective to cause the selected sets of storage and counting wheels to be engaged with and disengaged from the actuators in proper timing in subsequent ticket issuing operations to control the positioning of said actuators and the corresponding printing wheels to cause the number and the price corresponding to the class of tickets being issued to be printed on said tickets; and means common to all the sets of counting wheels and operating independently of the storage wheels to enter one in the selected set of counting wheels each machine operation to count the number of tickets issued in each class.

2. In a machine for printing and issuing several classes of tickets, the combination of a horizontal axle; a set of price storage elements for each class of tickets, mounted on the axle, said sets of elements settable to the prices of the corresponding classes of tickets; a set of ticket number elements for each class of tickets mounted on the axle; printing means for the sets of elements; means corresponding to the various classes of tickets for selecting the corresponding sets of storage and number elements for coaction with the printing means to cause the price and the number to be printed on each ticket issued in the different classes; and means common to all the sets of number elements and operating independently of the price storage elements to enter one in the selected set of number elements each ticket issuing operation to count the number of tickets issued in each class.

3. In a machine of the class described, constructed and arranged to perform ticket issuing operations and having a main operating mechanism, including a shaft with an invariable movement each ticket issuing operation, said machine also having means to print data on a ticket being issued, the combination of a member secured to the shaft; a horizontal axle; a plurality of sets of ticket price storage elements mounted on the axle; a step by step ticket number accumulator for each set of storage elements mounted on the axle; means operatively connected to the printing means and engageable by the various sets of storage elements and their associated accumulators; means to select the various sets of storage elements and their associated accumulators for engagement with the connecting means to control the positioning of the printing means to cause the price and the number of the various classes of tickets to be printed thereon; and means operated by the member each ticket issuing operation to enter "one" in the selected ticket number accumulator to count the number of tickets issued in each class.

4. In a machine of the class described constructed and arranged to perform preliminary ticket price-entering operations and subsequent ticket-issuing operations, the combination of means to set up ticket prices; a horizontal axle; a rockable framework to support the axle; a set of denominational price storage elements mounted on the axle; a corresponding set of denominational ticket-numbering elements mounted on the axle; differential actuators for the storage elements, said actuators positionable in a preliminary price-entering operations by the price-setting means; differential actuators for the numbering elements; means to rock the axle framework to engage and disengage the sets of elements and the actuators; means including a manipulative member to control the operation of the rocking means in preliminary price-entering operations and in subsequent ticket-issuing operations to cause the price set up on the setting means to be entered and stored in the storage elements in said preliminary price-entering operations and to cause the actuators to be positioned by the storage elements and the numbering elements in said ticket-issuing operations; printing means; connections between the printing means and the actuators to cause the ticket price and the ticket number to be printed on each ticket as it is issued; tens carrying mechanism for each denominational order of ticket-numbering elements; and means effective each ticket-issuing operation and operating independently of the storage elements to trip the corresponding carrying mechanism for the units ticket-numbering element to enter "one" in said element each time a ticket is printed and issued.

5. In a machine of the class described constructed and arranged to perform ticket-issuing operations in which several classes of tickets are printed and issued, the combination of a horizontal axle rockably and shiftably mounted; a set of price wheels for each class of tickets mounted on the axle; a set of counting wheels for each class of tickets mounted on the axle; a single set of differential actuators for the several sets of price wheels; a single set of differential actuators for the several sets of counting wheels; printing means operatively connected to the actuators for printing the data contained on the price and counting wheels on the tickets; selectively-controlled means to shift the axle to aline the corresponding sets of price and counting wheels with the actuators; means to rock the axle to engage and disengage the selected sets of price and counting wheels and the actuators to cause the data contained on said sets of wheels to be printed on the tickets; and means common to all the sets of counting wheels and operating independently of the price wheels each ticket-issuing operation to advance the units wheel of the selected set of counting wheels one increment to provide an accurate count of the number of tickets issued in each of the different classes.

6. In a machine of the class described, constructed and arranged to print and issue several classes of tickets, the combination of means to set up the prices of the several classes of tickets; a horizontal axle; a frame to rockably and shiftably support the axle; a set of denominational price storage elements for each class of tickets mounted on the axle; a set of denominational ticket-numbering elements for each set of storage elements mounted on the axle; differential actuators for the sets of storage elements, said actuators positioned by the price-setting means in preliminary price-entering operations; differential actuators for the sets of numbering elements; selecting means to shift the axle to aline the different sets of elements with the corresponding actuators; means to rock the axle frame to engage and disengage the selected sets of elements and the actuators; means including a manipulative member to control the operation of the rocking means in preliminary price-entering operations, and the subsequent ticket-issuing operations to cause the price of the various classes of tickets set up on the price-setting means to be entered and stored in the corresponding sets of storage elements in said preliminary price-entering operations, and to cause the actuators to be positioned by the selected sets of storage elements and numbering elements in said ticket-issuing operations; printing means; connections between the printing means and the actuators to cause the price and the corresponding number of the various classes of tickets to be printed on each of said tickets, as it is issued; a tens carry mechanism constructed and arranged to coact with the selected set of numbering elements; and means effective each ticket-issuing operation and operating independently of the price storage elements to trip the units order of the carry mechanism to cause "one" to be entered in the units element of the selected set of numbering elements each time a ticket is printed and issued.

MAYO A. GOODBAR.
RUSSELL G. PRATT.

References Cited in the file of this patent

UNITED STATES PATENTS

| Number | Name | Date |
|---|---|---|
| 1,394,256 | Fuller | Oct. 18, 1921 |
| 1,630,814 | Von Pein | May 31, 1927 |
| 1,908,068 | Shipley | May 9, 1933 |
| 2,056,536 | Sampson | Oct. 6, 1936 |
| 2,238,517 | Cooley | Apr. 15, 1941 |
| 2,279,858 | Breitling et al. | Apr. 14, 1942 |